(12) United States Patent
Friesel

(10) Patent No.: US 9,221,557 B1
(45) Date of Patent: Dec. 29, 2015

(54) UAV RETRIEVAL SYSTEM AND METHOD

(71) Applicant: Lockheed Martin Corporation, Bethesda, MD (US)

(72) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 251 days.

(21) Appl. No.: 13/788,053

(22) Filed: Mar. 7, 2013

(51) Int. Cl.
*B64F 1/02* (2006.01)

(52) U.S. Cl.
CPC ........................... *B64F 1/025* (2013.01)

(58) Field of Classification Search
CPC ................................................ B64F 1/025
USPC ..................... 244/110 E, 110 R, 110 G, 113
See application file for complete search history.

(56) References Cited

U.S. PATENT DOCUMENTS

| 4,311,290 | A | 1/1982 | Koper | |
|---|---|---|---|---|
| 7,264,204 | B1 | 9/2007 | Portmann | |
| 7,410,125 | B2 * | 8/2008 | Steele | 244/110 E |
| 8,038,097 | B1 * | 10/2011 | Monson et al. | 244/110 E |
| 8,464,981 | B2 * | 6/2013 | Goldie et al. | 244/110 E |
| 8,955,800 | B2 * | 2/2015 | McGeer et al. | 244/110 E |
| 9,004,402 | B2 * | 4/2015 | McGeer et al. | 244/110 C |

* cited by examiner

*Primary Examiner* — Justin Benedik

(74) *Attorney, Agent, or Firm* — Howard IP Law Group, PC

(57) ABSTRACT

An apparatus for capture of an unmanned aerial vehicle (UAV) comprises a wind tunnel including at least one fan for generating airflow in the wind tunnel; sensors for sensing characteristics of the UAV; and a control system coupled to said sensors and said at least one fan. The control system is configured to cause the at least one fan to generate airflow based on the sensed characteristics of the UAV to bring the UAV that is in the wind tunnel to a low or zero airspeed above a floor of the wind tunnel, thereby allowing the UAV to be dropped onto the floor of the wind tunnel when the airflow and a motive force of the UAV are stopped.

20 Claims, 3 Drawing Sheets

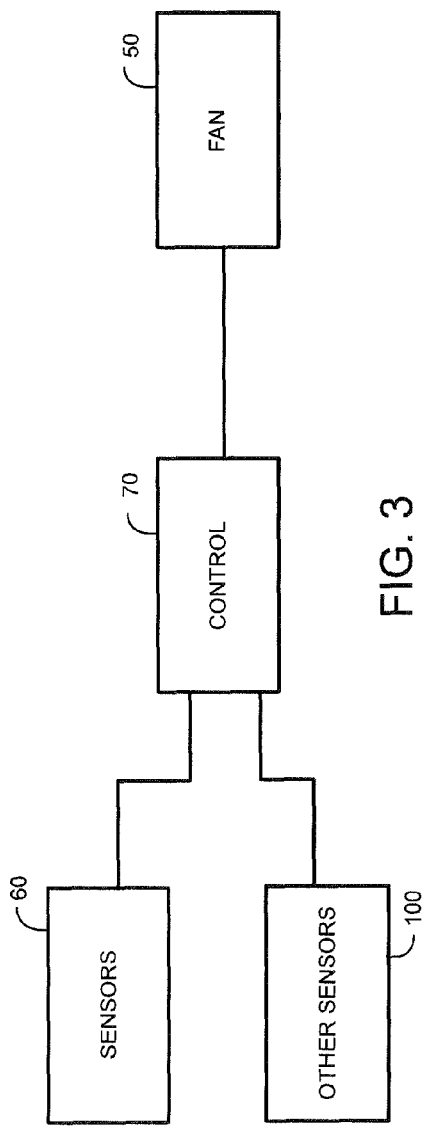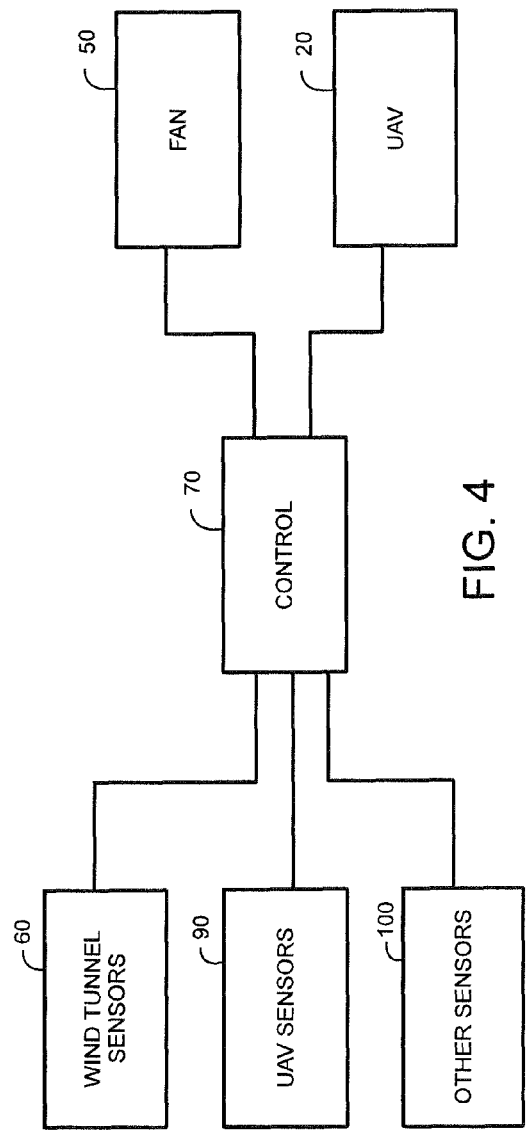

UAV RETRIEVAL SYSTEM AND METHOD

FIELD OF THE INVENTION

The present invention relates to systems for retrieving unmanned aerial vehicles ("UAVs").

BACKGROUND OF THE INVENTION

Unmanned Aerial vehicles or UAVs are widely used for reconnaissance operations. Armed UAVs are also used to carry out offensive strikes without risking injury to military personnel. Characteristically small, inexpensive, and pilotless (i.e., unmanned cockpit), the UAV is ideal for these purposes. UAVs may be small, hand-launched vehicles as well as higher-speed, heavier machines.

Notwithstanding the low cost of UAVs compared to manned vehicles, the UAV is not considered a disposable item. Therefore, recovery of UAVs after each mission is often desirable. Recovery is relatively straightforward when the UAV is operating over land. In such situations, the UAV may be brought down on a makeshift landing field, provided such a field is available and accessible to a retrieval team. However, landing is the most difficult and dangerous of all flight operations, and in many cases is avoided in favor of other retrieval methods.

Recovery is considerably more challenging when the UAV is operating at sea or when the UAV is operating over land with insufficient space to construct a makeshift landing field due to geographic constraints (e.g., mountainous areas) or other constraints such as safety constraints (e.g. where the desired landing field location is in a hostile area). In addition, runway landings require high precision control to avoid damage to the UAV. Landing of UAVs on ships involves its own complications due to the constant sway, roll, pitch and yaw of a ship at sea, which requires an even higher precision. In fact, it is quite difficult to safely land a UAV on the deck of a ship and as such, deck landings are rarely attempted.

Due to control and space resources necessary for standard aircraft landing, current state-of-the art is to recover UAVs by flying them into a net, which can cause damage to the vehicle. Net requirements for large and small UAVs may also differ since structural strength and landing speed may differ significantly, requiring that nets be interchanged. Furthermore, landings that use nets or hooks to capture the UAV may cause damage to the UAV, thereby preventing quick re-use of the UAV for further missions. An alternative to the deck landing is the water "landing," wherein the UAV descends into the sea. This technique has its own drawbacks, including a reasonable likelihood of damage to the UAV and risk to the recovery crew.

Alternative systems and methods for UAV recovery are desired.

SUMMARY OF THE INVENTION

According to an aspect of the present disclosure, there is provided a UAV recovery system that requires little deck space, enables rapid re-use of the UAV after recovery, and is less likely to damage a UAV than traditional recovery techniques.

In an illustrative embodiment of the disclosure, there is provided a system for retrieving a UAV while it is in flight that avoids some of the drawbacks of prior art systems.

In an illustrative embodiment, the UAV recovery system is configured for use at sea. In that configuration, the UAV recovery system includes a wind tunnel with a landing pad. The wind tunnel includes an automated response and control system to direct airflow to a UAV that enters the wind tunnel. The automated response and control system is configured to bring the UAV to low or zero airspeed, preferably at a low height. After reaching low or zero airspeed, airflow and UAV propulsion are terminated, which will cause the UAV to fall on the landing pad where it can be recovered.

An apparatus for capture of an unmanned aerial vehicle (UAV) may comprise: a wind tunnel including at least one fan for generating airflow in the wind tunnel; sensors for sensing characteristics of the UAV; and a control system coupled to the sensors and the at least one fan. The control system may be configured to cause the at least one fan to generate airflow based on the sensed characteristics of the UAV to bring the UAV directed into the wind tunnel to a low or zero airspeed above a floor of the wind tunnel, thereby allowing the UAV to land gently onto the floor of the wind tunnel when the airflow and a motive force of the UAV are stopped. In an embodiment, the sensors may comprise at least one of a speed sensor, a heading sensor, and an airflow sensor. In an embodiment, the control system may be configured to determine an inertial mass of the UAV based on the airflow sensor. In an embodiment, the control system may also be configured to vary a direction and speed of the airflow generated by the at least one fan to dynamically compensate for the inertial mass, speed, and heading of the UAV to bring the UAV to a low or zero airspeed above the floor of the wind tunnel. The apparatus may further comprise a database of UAV inertial masses, and the control system may be configured to determine the inertial mass of the UAV based on the database of UAV inertial masses. In an embodiment, the floor of the wind tunnel may comprise a landing pad onto which the UAV is landed or dropped.

A method for capturing an unmanned aerial vehicle may comprise: sensing characteristics relating to a UAV to be captured; directing the UAV into a wind tunnel; dynamically adjusting a speed and direction of an airflow in the wind tunnel based on the sensed characteristics to bring the UAV in the wind tunnel to a low or zero airspeed above a floor of the wind tunnel; and stopping the airflow and a motive force of the UAV, thereby causing the UAV to drop onto the floor of the wind tunnel. In an embodiment, sensing characteristics relating to the UAV may comprise sensing at least one of a speed, a heading, or an inertial mass of the UAV. Sensing the inertial mass of the UAV may comprise dynamically estimating the inertial mass of the UAV from a response of the UAV to the airflow. In an embodiment, sensing the inertial mass of the UAV comprises determining the inertial mass from a database of UAV inertial masses for a model of the UAV being captured. Dynamically adjusting the speed and direction of the airflow in the wind tunnel based on the sensed characteristics may comprise dynamically adjusting the speed and the direction of the airflow based on the speed, the heading, and the inertial mass of the UAV. The method may further comprise dynamically adjusting the speed and the direction of the airflow in the wind tunnel based on control parameters of the UAV. In an embodiment, the control parameters of the UAV comprise at least one of speed, acceleration, attitude, and heading of the UAV. Also in an embodiment, stopping the airflow and the motive force of the UAV may cause the UAV to drop onto a landing pad on the floor of the wind tunnel.

A system for capture of an unmanned aerial vehicle (UAV) may comprise: a wind tunnel including at least one fan for generating airflow in the wind tunnel; an integrated control for controlling flight control parameters of the UAV and the airflow generated by the at least one fan; sensors, for sensing characteristics relating to the UAV, coupled to the integrated control; and wind tunnel sensors, for sensing characteristics relating to the wind tunnel, coupled to the integrated control. The integrated control may be configured to dynamically adjust one or both of flight control parameters for the UAV and the airflow generated by the at least one fan, based on one or both of the sensed characteristics relating to the UAV and the sensed characteristics relating to the wind tunnel, to bring the UAV to a low or zero airspeed above a floor of the wind tunnel. The integrated control may be further configured to stop the airflow and a motive force of the UAV when the UAV is at the low or zero airspeed above the floor of the wind tunnel, thereby allowing the UAV to drop onto the floor of the wind tunnel.

The sensors for sensing characteristics relating to the UAV may comprise one or both of sensors on the UAV or sensors integral to the wind tunnel, including at least one of a speed sensor, an acceleration sensor, an attitude sensor, a heading sensor, and an airflow sensor. The sensors for sensing characteristics relating to the wind tunnel comprise at least one of a speed sensor, a heading sensor, and an airflow sensor. The integrated control may be further configured to dynamically adjust the airflow generated by the at least one fan based on the flight control parameters of the UAV including at least one of a speed, an acceleration, an attitude, and a heading of the UAV. In an embodiment, the integrated control dynamically adjusts one or both of a speed and a direction of the at least one fan to adjust the airflow generated in the wind tunnel. The integrated control may also be further configured to dynamically estimate the inertial mass of the UAV using an airflow sensor or a database of UAV inertial masses for a model of the UAV being captured, and the integrated control may be configured to dynamically adjust the airflow generated by the at least one fan based on the inertial mass of the UAV.

The present UAV recovery system may be a portable system. A portable system can be transferred to different ships and can also be used for land recoveries where space is not available to use full landing strips.

These and other features of a UAV recovery system in accordance with the illustrative embodiment, and variations thereof, are described further in the Detailed Description below and depicted in the accompanying Drawings.

BRIEF DESCRIPTION OF THE DRAWINGS

FIG. 3 depicts an embodiment of a control system for a UAV recovery system in accordance with an embodiment of the disclosure in which the control system controls the airflow of the wind tunnel; and FIG. 4 depicts an embodiment of a system for UAV recovery in accordance with an embodiment of the disclosure that may receive inputs from and send outputs to the UAV.

DETAILED DESCRIPTION

An alternative to landing strip, net, hook, or water landings is to retrieve or capture the UAV using a wind tunnel. In principle, the UAV will approach for landing at a given airspeed—a result of combined forces thrust, lift, drag, and the momentum of the vehicle. In steady flight the thrust is used to maintain airspeed, while the latter forces (and other similar effects) are a consequence of the speed of the UAV relative to the air. Entering a wind tunnel, the desired effect is to reduce airspeed relative to the platform to zero as the wind speed is simultaneously reduced to zero, while maintaining stability and not damaging the vehicle.

Figure 1:
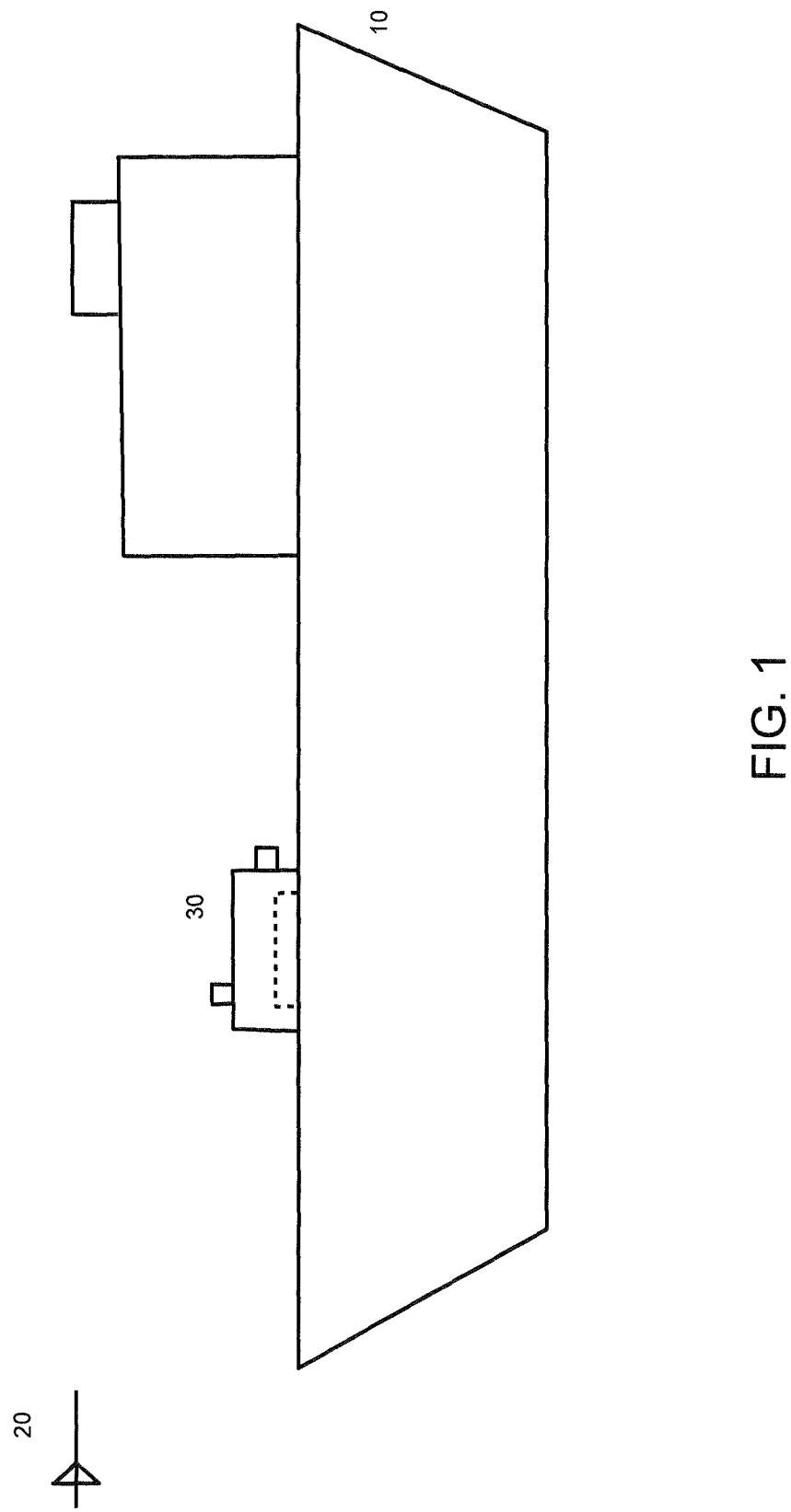
FIG. 1 depicts an embodiment of a UAV recovery system mounted on the deck of a ship.

FIG. 1 depicts a side view of a ship 10, a UAV 20, and a UAV recovery system 30 mounted on the deck of the ship.

Figure 2:
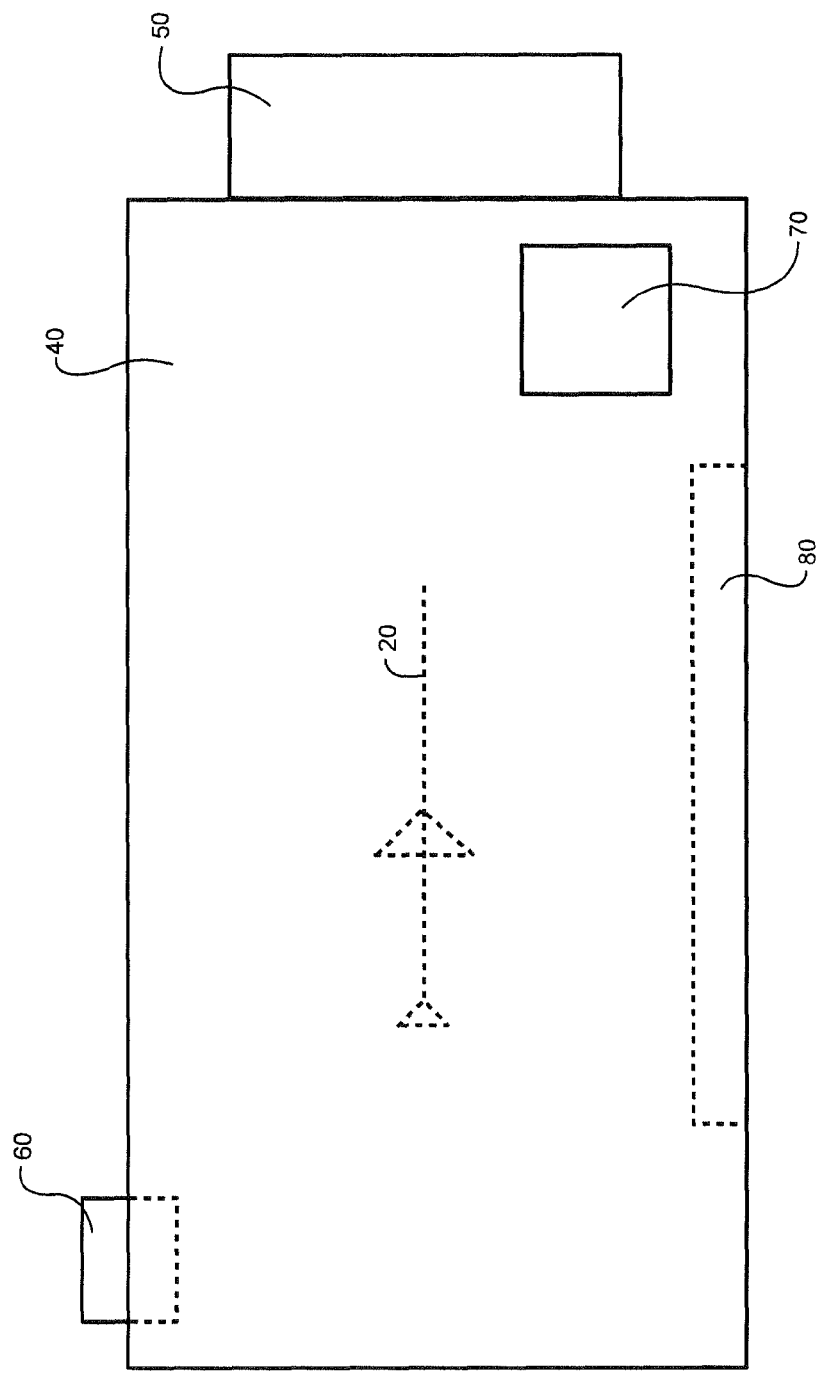
FIG. 2 depicts an embodiment of a side view of a UAV recovery system in accordance with the illustrative embodiment of the disclosure.

FIG. 2 depicts a side view of a UAV recovery system 30 in accordance with the illustrative embodiment of the present invention. The UAV recovery system 30 includes a wind tunnel portion 40, at least one fan 50 for generating airflow in the wind tunnel, a sensor or sensors 60 for sensing characteristics of a UAV to be captured, a control system 70 for controlling the fan 50 and receiving sensor information 60, and a landing pad 80 onto which a UAV 20 may be dropped.

The wind tunnel portion may typically comprise a solid structure constructed from a material such as a lightweight aluminum, a composite material, or a plastic, which material will allow the wind tunnel to hold an airflow created by the fan 50. For use at sea, the wind tunnel may include components advantageously formed from a material(s) that is resistant to corrosion, which may include stainless steel. The use of lightweight materials may allow the wind tunnel to be portable so that it may be moved as a single piece to different locations on a ship or to different locations on land. In an alternative embodiment, the wind tunnel portion may be constructed using a frame and panels (such as aluminum or composite panels) that allow the wind tunnel portion to be deconstructed or taken apart as needed, and which may also allow the wind tunnel to be stored in a smaller amount of space. As will be understood, the wind tunnel is configured to withstand the airflow expected to be used within it. In an embodiment, the wind tunnel may have a floor, which may be desirable in a dusty or sandy environment to prevent dust or sand from being whipped up by the fan of the wind tunnel or the UAV. In another embodiment, the floor of the wind tunnel is comprised of the surface onto which the wind tunnel is placed. For example, the wind tunnel may have a cross-section of an upside down "U," with the floor of the wind tunnel being formed by the deck of the ship onto which the wind tunnel is placed. In this embodiment, appropriate measures may be taken to ensure that there is little or no leakage of air underneath the walls of the wind tunnel (e.g., rubber gaskets may be placed on the bottom edges of the walls). In addition, for this and any embodiment of the wind tunnel, the wind tunnel may be sufficiently anchored to the deck of the ship or other location on which it is placed to ensure that the wind tunnel does not move due to airflow from the fan or due to the airflow generated by the UAV within the wind tunnel.

The size of the wind tunnel may depend on several factors. For example, the size of the wind tunnel must be large enough to accommodate the UAV it is trying to capture. Therefore, the size of the particular type of UAV to be captured will partially dictate the size of the wind tunnel. That is, the width and height of the wind tunnel must be adequate to allow the capture of a UAV, and as will be understood an appropriate safety margin (e.g., width is four times as wide as the wingspan of the largest UAV to be captured) may be selected to minimize the possibility of impact of a UAV with the wind tunnel. The length of the wind tunnel may depend on the strength of the fans within the wind tunnel, as the length will need to be long enough for the airflow to bring the UAV to very low or zero airspeed. Another important factor in the size of the wind tunnel is the accuracy and response time of the control system that is controlling the UAV. As will be understood, where the control system is very accurate and/or where the control system has a fast response time, a smaller wind tunnel may be appropriate. Conversely, where the control system is less accurate and/or has a slower response time, a larger wind tunnel may be desirable to compensate for the lower accuracy and/or slower response time. Other factors such as the physical limitations of the locations where the wind tunnel is deployed may be considered, such as the amount of room available on a ship for the wind tunnel. The location where the wind tunnel is placed may also depend on several factors. On a ship, it may be advantageous to locate the wind tunnel on a known flight path, for ships on which aircraft are regularly landed, such as carriers. Likewise, it may be advantageous to position the wind tunnel in a location where there is space to maneuver the UAV away from the wind tunnel in the case of an aborted capture.

The fan portion 50 may comprise a configuration of a single fan or multiple fans, which may be located at an end of the wind tunnel or at alternate positions of the wind tunnel. The fan(s) may be dynamically adjustable and positionable so that the direction of the airflow may be controlled. The speed of the fans may be dynamically adjustable so that the speed of the airflow may be controlled. In an embodiment, the UAV recovery system 30 may include fans at the bottom of the wind tunnel that point upward, that may be used to control the drop of the UAV onto the landing pad to prevent unduly hard drops that may damage the UAV. As will be understood, if the wind tunnel includes a landing pad 80, the fans may be integrated with the landing pad so that they are not obstructed. For example, the landing pad 80 may have one or more circular openings below each of which a fan is placed, which allows the fans to project air upward without being obstructed by the landing pad. As will be understood, the landing pad may be constructed of material that softens the drop of the UAV so that damage to the UAV may be prevented. In an embodiment, the landing pad may be an inflatable pad constructed of durable materials that can withstand the drop of a UAV. An inflatable pad may have venting that allows some of the air to escape when the UAV is dropped onto it so that the pad does not burst from the pressure of the UAV drop. In another embodiment, the landing pad may be made from a foam or other type of material that is capable of softening the drop of a UAV. In another embodiment, the landing pad may be a durable balloon-like structure that may be filled with a liquid such as water, and which includes a tube that allows the liquid to be expelled from the pad (and perhaps directed to a drain) when a UAV is dropped onto it. This structure is also capable of softening the drop of a UAV. In another embodiment, the landing pad may comprise horizontal netting that catches the UAV before it impacts the floor of the wind tunnel. As will be understood, netting with closer hole spacing may be less likely to damage the UAV but may be more susceptible to being displaced by the wind tunnel fan; suitable netting that is appropriately anchored may be selected.

The UAV recovery system 30 may also include sensors 60 for sensing characteristics of the UAV being captured. These sensors may be integral to the wind tunnel or non-integral devices that are added to the wind tunnel when it is constructed. In an embodiment, the UAV recovery system 30 includes sensors that are capable of sensing characteristics of the UAV when the UAV is both outside and inside of the wind tunnel. Thus, the UAV recovery system may include sensors that are external to the wind tunnel which can sense, for example, the location, speed, heading, altitude, and acceleration of the UAV to be captured. In addition, the UAV recovery system may include sensors that are internal to the wind tunnel which can sense, for example, the position and height of the UAV within the wind tunnel and/or the speed and heading of the UAV within the wind tunnel. The UAV recovery system may also include a camera for viewing the UAV's position within the wind tunnel, a camera being a type of sensor. The UAV recovery system may also include an airflow sensor within the wind tunnel that may dynamically estimate the inertial mass of the UAV based on the UAV's response to the airflow. In another embodiment, the UAV recovery system may include a database or library of UAV inertial masses for different known UAV models, and the control system may be configured to determine the inertial mass of a UAV being monitored based on the UAV's model and the database of UAV inertial masses. As will be understood, the sensors that are external to the wind tunnel may be part of the UAV recovery system (e.g., attached to an exterior of the wind tunnel) or in another embodiment they may be external sensors that are part of a different system that feed information to the UAV recovery system. For example, where the UAV recovery system is used on a ship, the ship will usually have much more sophisticated sensors than can be installed on a portable wind tunnel. Accordingly, it may be advantageous for sensor data from other systems to be used by the UAV recovery system.

Essential to use of a wind tunnel to capture or retrieve a UAV is a coupling or coordination between the UAV airspeed and the wind speed in the tunnel. In an embodiment, this coupling may be accomplished by varying the wind speed (via the fans in the wind tunnel) to conform to the relative airspeed of the UAV. In another embodiment coordination between the UAV airspeed and wind speed in the tunnel may be accomplished by controlling the UAV to maintain constant speed with respect to the wind speed of the tunnel, either via feedback or direct command coupling between the wind tunnel and UAV control systems. In a feedback configuration, a change in wind speed in the tunnel is evaluated for its effect on the UAV airspeed, and the wind speed is adjusted until the desired airspeed/airspeed reduction is achieved. In a direct command configuration, coupling or coordination may be achieved by transmitting wind speed commands from the wind tunnel control directly to the UAV. The UAV then controls its power response accordingly, based upon the wind speed commands. Feedback and direct control may also be achieved by inverting the role of the wind tunnel and UAV controls above. Guidance and stability of the UAV may be ensured in a number of ways. One approach is to design for stable wind flow in the wind tunnel and rely on UAV control for stability and guidance, possibly aided by the use of visual or radio markers such as an illuminated guidance pattern visible to sensors on the UAV. An alternative approach is to control the UAV by using a designed wind flow pattern that works in conjunction with airspeed/windspeed control to stabilize the UAV on the guide path within the tunnel.

Accordingly, the UAV recovery system may also include a control system 70 for controlling the fan or fans that generate airflow in the wind tunnel. As shown in FIG. 3, the control system 70 may typically receive information from sensor 60 or other sensors 100 (e.g., a ship's sensors), which information the control system 70 will use to dynamically control, adjust, and vary the direction and/or speed of the fan or fans 50 so that a UAV that is directed or steered into the wind tunnel will be faced with an appropriate force and direction of airflow that is dynamically matched with the speed and direction of the UAV to cause the UAV to drop to low or zero airspeed, preferably at a low height over the floor or a landing pad. As will be understood, the control system may dynamically control, regulate, or vary the speed and direction of the airflow produced by the fan or fans so that the UAV drops to low or zero airspeed over a desired dropping point, such as in the center of a landing pad. As noted, in an embodiment the fans may be configured to create a designed wind flow pattern that works in conjunction with airspeed/windspeed control to stabilize the UAV. The sensors may be hard wired to the control system 70 or may be connected wirelessly with the sensors and control system using known transmitters, receivers, and/or transceivers for communications. Causing the UAV to reach low or zero airspeed will allow it to be dropped onto the floor of the wind tunnel or onto a landing pad or net on the floor of the wind tunnel by stopping the fan or fans and stopping the motive force (i.e., engine or motor) for the UAV.

The control system 70 may be a unit located on the UAV recovery system, or it may be a unit remotely located from the UAV recovery system that is in communication (via computer network or other known communications) with the fans and sensors on the UAV recovery system. As will be understood, the control system 70 may include appropriate feedback control mechanisms that control the fan or fans based on the sensor information received by the control system. In an embodiment, the feedback control can be used to overcome improper or incorrect calibration of controls used to control the fan speed and direction. For example, if the fan speed is set at X mph and the sensors indicate that the actual sensed speed of the airflow is X-10 mph, the feedback control would increase the fan speed until the desired sensed speed is reached. A variety of different sensors may be used in the control system, including temperature sensors, humidity sensors, or any type of sensor that can sense conditions within the wind tunnel that may impact settings used to capture a UAV. The control system may also be coupled to visual or radio markers such as an illuminated guidance pattern, which would be visible to sensors on the UAV.

In an embodiment, control of the UAV is separate from control of the UAV recovery system. In some embodiments, UAV may be remotely controlled by a pilot that is stationed near the wind tunnel, such as on the deck of the ship where the wind tunnel is located. In another embodiment, the UAV may be controlled by a pilot that is remotely located from the wind tunnel, perhaps in a ground facility far away from the UAV. In either embodiment, the UAV may have a video camera and a transmitter that allows the UAV to send video images and information from sensors on the UAV (e.g., sensors that measure speed, acceleration, attitude, location, and heading of the UAV) to the pilot. As will be understood, the pilot will have controls that enable the pilot to direct and control the speed, acceleration, attitude, and heading of the UAV, which controls enable the pilot to direct the UAV into the wind tunnel and traverse at least a part of the wind tunnel until the UAV is dropped onto the floor of the wind tunnel. In an embodiment in which control of the UAV is separate from the control of the UAV recovery system, UAV pilots may receive instruction on, and receive training in, how to approach the wind tunnel with the UAV, including, but not limited to the proper entry speed, angle, heading, and elevation for flying the UAV into the wind tunnel. As noted, in one embodiment the wind tunnel may be configured to create a designed and/or stable wind flow pattern, in which case guidance and stability of the UAV is controlled by the UAV pilot. In another embodiment, the wind tunnel may be configured to vary its windflow pattern and speed relative to the UAV, in which case the UAV recovery system control system will monitor the UAV with its sensors (and perhaps other sensors that are linked to the control system) and control the fans in the wind tunnel to generate the appropriate speed and direction of airflow.

In another embodiment, control of the UAV may be integrated with control of the UAV recovery system in an integrated control system for capture of a UAV. As shown in FIG. 4, in this embodiment sensor data from the UAV 90, from the UAV recovery system 60, and from other sensors that (such as sensors on a ship) may be networked with or otherwise communicatively coupled to the integrated control 70. Additionally, the processor may receive data about the ship's movement (e.g., speed, heading, etc.) when the wind tunnel is used on a ship, such as from an inertial measurement unit ("IMU") and other data that enables the processor to precisely determine the position of the wind tunnel and the position of UAV.

In addition, the integrated control 70 is communicatively coupled to the fan 50 and the UAV 20 so that it may dynamically adjust and control one or both of the airflow in the wind tunnel and the movement of the UAV. Furthermore, because the UAV is coupled to the integrated control 70, all of the flight control parameters (i.e., the parameters of the controls used to fly the UAV) and settings of the UAV are available to the integrated control 70 (and hence also available to the recovery system), which will enable the recovery system to know various parameters of the UAV such as its speed, location, elevation, heading, altitude, and acceleration. This data may supplement or substitute for similar data received from the UAV recovery system's own sensors, and may increase the speed with which the data is received and increase the accuracy of the data, both of which may result in smoother UAV captures. As will be understood, in one embodiment, an integrated control system may be used to configure an automatic UAV recovery system. In this embodiment, all of the data relating to the UAV can be used by the recovery system to dynamically control the flight control parameters of the UAV (e.g., its speed, acceleration, attitude, and heading) as well as the parameters used to control the wind tunnel fan (e.g., the speed and/or direction of the airflow within the wind tunnel) so that the UAV reaches low or zero airspeed at a low elevation over the floor (or landing pad) of the wind tunnel. In other embodiments, the integrated control system may be configured to be more manual in nature. For example, in an embodiment with an integrated control system, the system may still be configured to require a pilot to fly the UAV into the wind tunnel. In this embodiment, the integrated control system will still be beneficial as it will increase the speed with which data is received and the accuracy of the data, which may allow the pilot to more quickly and accurately know the conditions in the wind tunnel, and which may allow airflow to be adjusted in the wind tunnel more quickly and accurately, both of which may enable better landings.

In a further embodiment, the UAV control system, whether or not it is integrated with the UAV control system, may be configured to allow for an essentially automatic entry of the UAV into the wind tunnel for capture. In this embodiment, the UAV control system may include a processor and target recognition programming that allows the UAV to identify a UAV recovery system wind tunnel and its entrance, which may include markings for targeting purposes. The UAV control system may further include "auto-pilot" programming that allows the UAV control system to cause the UAV to enter the recovery system wind tunnel at an appropriate speed, elevation, and heading. As will be understood, in the embodiment in which the UAV control system is integrated with the UAV recovery system, the target recognition and auto-pilot programming may allow for automated recovery of UAVs. In an embodiment in which the recovery system is placed on a ship, the other sensors 100 that may feed data to the control 70 may include a ship's inertial measurement unit ("IMU") which may feed data about the ship's movement (e.g., speed, attitude, heading, etc.) to the control system. This data may better permit the target recognition and auto-pilot programming to perform an automated recovery by taking into account possible ship movements that may affect the attitude and position of the UAV recovery system in relation to the UAV. In another embodiment, a UAV recovery system may be implemented in which the wind tunnel control may transmit location information for the wind tunnel (e.g., its location, its elevation, its entrance coordinates, and the orientation of the tunnel) to the UAV control system, which the control system may then use to cause the UAV to enter the recovery system wind tunnel at an appropriate speed, elevation, and heading. In this embodiment, markings for targeting purposes may not be necessary if the wind tunnel position is stable or if the wind tunnel control system is able to update its location information as frequently as needed to ensure a successful capture.

In some embodiments, UAV recovery system 30 may include netting that serves as a backup to protect the wind tunnel and fans in case, for example, UAV control is lost and the UAV enters the wind tunnel at a speed and/or heading for which it cannot be stopped by the airflow. As will be understood, the netting may include upright netting on the sides of the wind tunnel, netting at the rear of the wind tunnel to prevent the UAV from impacting the fans, and even netting at the top of the wind tunnel that may prevent an out of control UAV from escaping the wind tunnel and possibly causing damage to a ship (when the recovery system is used on a ship) on which the UAV is placed.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiment of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

The functions and blocks provided in FIGS. 1-4 may be implemented using hardware (such as computers, memory, processors, sensors, and the like), software, firmware, and may reside on one or more computer systems located at one or more locations. In an embodiment in which different parts of the system (e.g., the ships sensors and the control module for the UAV capture system or a UAV control and the UAV capture system) are remotely located from each other, a computer network, or other network capable of transmitting data and information between the different parts of the system may be used to connect the different parts. As described, sensors may be based at a variety of locations such as on the ship, on the UAV, or on the wind tunnel. Data from other sensors (e.g., sensors on a satellite that sense speed) may also be used, and the sensor data from the variety of different sensors at different locations may be communicated via computer network (or other communications means) to the location of the UAV control.

What is claimed is:

1. An apparatus for capture of an unmanned aerial vehicle (UAV) comprising:
    a wind tunnel including at least one fan for generating airflow in the wind tunnel;
    sensors for sensing characteristics of the UAV; and
    a control system coupled to said sensors and said at least one fan;
    wherein said control system is configured to cause the at least one fan to vary the airflow based on the sensed characteristics of the UAV, to bring the UAV to a low or zero airspeed above a floor of the wind tunnel after the UAV enters and traverses a portion of the wind tunnel, thereby allowing the UAV to be dropped onto the floor of the wind tunnel when the airflow and a motive force of the UAV are stopped.

2. The apparatus of claim 1, wherein the sensors comprise at least one of a speed sensor, a heading sensor, and an airflow sensor.

3. The apparatus of claim 2, wherein the control system is configured to determine an inertial mass of the UAV based on the airflow sensor.

4. The apparatus of claim 3, wherein the control system is configured to vary a direction and speed of the airflow generated by the at least one fan to dynamically match the inertial mass, speed, and heading of the UAV to bring the UAV to a low or zero airspeed above the floor of the wind tunnel.

5. The apparatus of claim 1, further comprising a database of UAV inertial masses, and wherein the control system is configured to determine the inertial mass of the UAV based on the database of UAV inertial masses.

6. The apparatus of claim 1, wherein the floor of the wind tunnel comprises a landing pad onto which the UAV is dropped.

7. A method for capturing an unmanned aerial vehicle (UAV) comprising:
    sensing characteristics relating to a UAV to be captured;
    directing said UAV into a wind tunnel;
    dynamically adjusting a speed and direction of an airflow in the wind tunnel based on the sensed characteristics to bring the UAV in the wind tunnel to a low or zero airspeed at a low height above a floor of said wind tunnel; and
    stopping the airflow and a motive force of the UAV, thereby causing the UAV to drop onto the floor of said wind tunnel.

8. The method of claim 7, wherein sensing characteristics relating to the UAV comprises sensing at least one of a speed, a heading, or an inertial mass of the UAV.

9. The method of claim 8, wherein sensing the inertial mass of the UAV comprises dynamically estimating the inertial mass of the UAV from a response of the UAV to the airflow.

10. The method of claim 8, wherein sensing the inertial mass of the UAV comprises determining the inertial mass from a database of UAV inertial masses for a model of the UAV being captured.

11. The method of claim 8, wherein dynamically adjusting the speed and the direction of the airflow in the wind tunnel based on the sensed characteristics comprises dynamically adjusting the speed and the direction of the airflow based on the speed, the heading, and the inertial mass of the UAV.

12. The method of claim 11, further comprising dynamically adjusting the speed and the direction of the airflow in the wind tunnel based on control parameters of the UAV.

13. The method of claim 12, wherein the control parameters of the UAV comprise at least one of speed, acceleration, attitude, and heading of the UAV.

14. The method of claim 7, wherein stopping the airflow and the motive force of the UAV causes the UAV to drop onto a landing pad on the floor of said wind tunnel.

15. A system for capture of an unmanned aerial vehicle (UAV) comprising:
- a wind tunnel including at least one fan for generating airflow in the wind tunnel;
- an integrated control for controlling flight control parameters of the UAV and the airflow generated by the at least one fan;
- sensors, for sensing characteristics relating to the UAV, coupled to the integrated control; and
- wind tunnel sensors, for sensing characteristics relating to the wind tunnel, coupled to the integrated control;
- wherein the integrated control is configured to dynamically adjust one or both of flight control parameters for the UAV and the airflow generated by the at least one fan, based on one or both of the sensed characteristics relating to the UAV and the sensed characteristics relating to the wind tunnel, to bring the UAV to a low or zero airspeed above a floor of the wind tunnel, and
- wherein the integrated control is further configured to stop the airflow and a motive force of the UAV when the UAV is at the low or zero airspeed above the floor of the wind tunnel, thereby allowing the UAV to drop onto the floor of the wind tunnel.

16. The system of claim 15, wherein the sensors for sensing characteristics relating to the UAV comprise one or both of sensors on the UAV or sensors integral to the wind tunnel, including at least one of a speed sensor, an acceleration sensor, an attitude sensor, a heading sensor, and an airflow sensor.

17. The system of claim 15, wherein the sensors for sensing characteristics relating to the wind tunnel comprise at least one of a speed sensor, a heading sensor, and an airflow sensor.

18. The system of claim 15, wherein the integrated control is further configured to dynamically adjust the airflow generated by the at least one fan based on the flight control parameters of the UAV including at least one of a speed, an acceleration, an attitude, and a heading of the UAV.

19. The system of claim 15, wherein the integrated control dynamically adjusts one or both of a speed and a direction of the at least one fan to adjust the airflow generated by the at least one fan in the wind tunnel.

20. The system of claim 15, wherein the integrated control is further configured to dynamically estimate the inertial mass of the UAV using an airflow sensor or a database of UAV inertial masses for a model of the UAV being captured, and wherein the integrated control is further configured to dynamically adjust the airflow generated by the at least one fan based on the estimated inertial mass of the UAV.

* * * * *